(12) United States Patent
Shimonishi et al.

(10) Patent No.: US 9,979,022 B2
(45) Date of Patent: May 22, 2018

(54) POSITIVE ELECTRODE MATERIAL, POSITIVE ELECTRODE FOR NON-AQUEOUS ELECTROLYTE SECONDARY BATTERY, AND NON-AQUEOUS ELECTROLYTE SECONDARY BATTERY

(71) Applicant: DENSO CORPORATION, Kariya, Aichi-pref. (JP)

(72) Inventors: Yuta Shimonishi, Kariya (JP); Nobuo Yamamoto, Kariya (JP); Shigeki Komine, Kariya (JP); Yoshinori Satou, Kariya (JP); Yuki Tachibana, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 73 days.

(21) Appl. No.: 15/084,517

(22) Filed: Mar. 30, 2016

(65) Prior Publication Data

US 2016/0293953 A1 Oct. 6, 2016

(30) Foreign Application Priority Data

Mar. 31, 2015 (JP) .................................. 2015-071647
Mar. 31, 2015 (JP) .................................. 2015-071706

(51) Int. Cl.
*H01B 1/08* (2006.01)
*H01M 4/525* (2010.01)
(Continued)

(52) U.S. Cl.
CPC .............. *H01M 4/525* (2013.01); *H01B 1/08* (2013.01); *H01M 2/0222* (2013.01);
(Continued)

(58) Field of Classification Search
CPC ....... H01M 10/0525; H01M 2004/028; H01M 2220/30; H01M 2/0222; H01M 4/131; H01M 4/505; H01M 4/525; H01B 1/08
See application file for complete search history.

(56) References Cited

U.S. PATENT DOCUMENTS 6,875,416 B1 * 4/2005 Benz ..................... H01M 4/525
252/182.1
7,592,100 B2 * 9/2009 Ohzuku .................. H01M 4/13
429/218.1
(Continued)

FOREIGN PATENT DOCUMENTS

JP   2001-250551 A    9/2001
JP   2001-345101 A   12/2001
(Continued)

OTHER PUBLICATIONS

Seung-Taek Myung, Shinichi Komaba, Kiyoharu Hosoya, Norimitsu Hirosaki, Yusuke Miura, and Naoaki Kumagai, *Synthesis of LiNiO.5MnO.5-xTixO2 by an Emulsion Drying Method and Effect of Ti on Structure and Electrochemical Properties*, Mar. 30, 2005, vol. 17, p. 2427-2435, Chem. Mater.

(Continued)

*Primary Examiner* — Mark Kopec
*Assistant Examiner* — Jaison P Thomas
(74) *Attorney, Agent, or Firm* — Harness, Dickey & Pierce, P.L.C.

(57) ABSTRACT

A positive electrode material includes: $Li_2Ni_\alpha M^1_\beta M^2_\gamma Mn_\eta O_{4-\in}$ that has a layered structure including a Li layer and a Ni layer, and in which a Ni—O bond length is shorter than that calculated from the Shannon's ionic radii. $\alpha$ satisfies a relation of $0.50<\alpha\leq 1.33$, $\beta$ satisfies a relation of $0\leq\beta<0.67$, $\gamma$ satisfies a relation of $0.33\leq\gamma\leq 1.1$, $\eta$ satisfies a relation of $0\leq\eta\leq 1.00$, $\in$ satisfies a relation of $0\leq\in\leq 1.00$, $M^1$ represents at least one selected from Co and (Continued)

Ga, $M^2$ represents at least one selected from Ge, Sn and Sb. A positive electrode material may indicate a peak intensity ratio ($I_{003}/I_{104}$) of 0.9 or more in a measurement of a powder X-ray diffraction indexed with a space group of R3m.

8 Claims, 3 Drawing Sheets (51) Int. Cl.
H01M 4/505 (2010.01)
H01M 2/02 (2006.01)
H01M 4/131 (2010.01)
H01M 10/0525 (2010.01)
H01M 4/02 (2006.01)

(52) U.S. Cl.
CPC ........... *H01M 4/131* (2013.01); *H01M 4/505* (2013.01); *H01M 10/0525* (2013.01); *H01M 2004/028* (2013.01); *H01M 2220/30* (2013.01)

(56) References Cited

U.S. PATENT DOCUMENTS

| | | |
|---|---|---|
| 8,734,994 B2 | 5/2014 | Park et al. |
| 2001/0024753 A1 | 9/2001 | Munakata et al. |
| 2002/0012842 A1 | 1/2002 | Tsujimoto et al. |
| 2003/0013017 A1 | 1/2003 | Nagayama et al. |
| 2003/0087154 A1 | 5/2003 | Ohzuku et al. |
| 2005/0191551 A1 | 9/2005 | Tsujimoto et al. |
| 2007/0122703 A1* | 5/2007 | Whitfield ........... C01G 45/1228 429/224 |
| 2007/0207383 A1 | 9/2007 | Ohzuku et al. |
| 2008/0116418 A1 | 5/2008 | Tabuchi et al. |
| 2012/0292562 A1 | 11/2012 | Kajiya et al. |
| 2014/0114519 A1* | 4/2014 | Iwama ................. H01M 4/485 701/22 |
| 2015/0037679 A1* | 2/2015 | Barker ................. C01G 45/006 429/231.2 |
| 2015/0147653 A1* | 5/2015 | Nomura ................ H01M 4/525 429/223 |
| 2015/0380737 A1* | 12/2015 | Kawasato ............ H01M 4/525 429/223 |
| 2017/0125801 A1* | 5/2017 | Kim ..................... H01M 4/366 |

FOREIGN PATENT DOCUMENTS

| | | |
|---|---|---|
| JP | 2003-203633 A | 7/2003 |
| JP | 3782058 B2 | 6/2006 |
| JP | 2006-202702 A | 8/2006 |
| JP | 2007-188703 A | 7/2007 |
| JP | 2008-127233 A | 6/2008 |
| WO | WO-2011/096522 A1 | 8/2011 |

OTHER PUBLICATIONS

R. Dominko, *Li2MSiO4 (M=Fe and/or Mn) cathode materials*, Oct. 1, 2008, pp. 462-468, Journal of Power Sources, vol. 184, Issue 2.

* cited by examiner

POSITIVE ELECTRODE MATERIAL, POSITIVE ELECTRODE FOR NON-AQUEOUS ELECTROLYTE SECONDARY BATTERY, AND NON-AQUEOUS ELECTROLYTE SECONDARY BATTERY

CROSS REFERENCE TO RELATED APPLICATIONS

This application is based on Japanese Patent Applications No. 2015-71706 filed on Mar. 31, 2015 and No. 2015-71647 filed on Mar. 31, 2015, the disclosures of which are incorporated herein by reference.

TECHNICAL FIELD

The present disclosure relates to a positive electrode material, a positive electrode for a non-aqueous electrolyte secondary battery, and a non-aqueous electrolyte secondary battery having the positive electrode.

BACKGROUND

With the spread of electronic devices such as notebook computers, mobile phones, and digital cameras, the demand for secondary batteries for driving these electronic devices is on the increase. In recent years, these electronic devices have increasingly high power consumption with enhancement of functionalities thereof and have been expected to be reduced in size, and hence improvement in performance of the secondary batteries has been required. Among the secondary batteries, a non-aqueous electrolyte secondary battery (particularly, a lithium-ion secondary battery) can be increased in capacity, and this battery has thus been applied to a variety of electronic devices.

Generally, a non-aqueous electrolyte secondary battery has a configuration in which a positive electrode and a negative electrode are connected via a non-aqueous electrolyte (non-aqueous electrolytic solution), and stored in a battery case. In the positive electrode, a positive electrode active material layer containing a positive electrode material typified by a positive electrode active material is formed on the surface of a positive electrode current collector. In the negative electrode, a negative electrode active material layer containing a negative electrode active material is formed on the surface of a negative electrode current collector.

In a lithium-ion secondary battery as a typical example of the non-aqueous electrolyte secondary battery, a lithium composite oxide is used as a positive electrode material (positive electrode active material). This composite oxide is described in Patent Literatures 1 to 8, for example.

Patent Literature 1 describes a positive electrode active material layer obtained by mixing $Li_xCoMO_2$ and $LiNiMnMO_2$ (both of M are selected from predetermined elements). This positive electrode active material includes an active material having a high average voltage at a time of discharge, and an active material with high thermal stability.

Patent Literature 2 describes a positive electrode active material containing a crystal layer with a layered rock-salt structure of $LiNiMnTiO_2$. By containing Ti, this positive electrode active material can obtain high charge/discharge capacities as compared to the case of not containing Ti.

Patent Literature 3 describes a positive electrode active material obtained by mixing $Li_xMnMO_4$ and $LiNiMO_2$ (both of M are selected from predetermined elements). This positive electrode active material is excellent in battery performance after storage at high temperature.

Patent Literature 4 describes a positive electrode active material in which a portion of Li lacks in $LiMnMO_2$ having a layered polycrystalline structure (M is selected from predetermined elements). In this positive electrode, distortion and a chemical bond in the crystal are stabilized, to obtain effects of cycle stability during charge/discharge, durable stability, and the like.

Patent Literature 5 describes a positive electrode active material obtained by replacing a portion of Li and a portion of Co with a predetermined element M in $LiCoO_2$ (both of M are selected from predetermined elements). In this positive electrode active material, by replacement of Li and Co with the element M, binding force between a lithium layer and a cobalt layer is strengthened and distortion between the layers and expansion of a crystal lattice are reduced, to obtain the effects of cycle stability during charge/discharge, durable stability, and the like.

Patent Literature 6 describes a positive electrode active material obtained by mixing $LiNiMnCoO_2$ and $Li_2MO_3$ (M is selected from predetermined elements). This positive electrode active material layer includes an active material which exerts an excellent effect on battery capacity and safety and an active material which exerts an effect on cycle characteristics and storage characteristics.

However, any of these positive electrode active materials (positive electrode materials) cannot sufficiently reduce destruction of the crystal structure during charge/discharge, leading to a decrease in capacity of the non-aqueous electrolyte secondary battery.

For the safety, Non Patent Literature 1 describes a technique of forming a positive electrode containing Ti, namely $LiNiMnTiO_2$.

However, this Non Patent Literature 1 describes that addition of approximately 30% of Ti does not significantly improve the safety.

As another attempt to achieve both the safety and high stability of crystals, Non Patent Literature 2 describes a technique of forming a positive electrode active material that contains Si, having strong binding force with oxygen, in the same amount as that of a transition metal, namely $Li_2MnSiO_4$.

However, the transition metal takes a 4-coordinated coordination structure in this positive electrode active material, causing instability of the structure during charge, and after all, it is not a positive electrode active material having sufficient durability.

Patent Literature 7 describes a positive electrode active material having Li oxide represented by $Li[Li_xMe_yM'_z]O_{2+d}$ (x+y+z=1, 0<x<0.33, 0.05≤y≤0.15, 0<d≤0.1, Me: at least one selected from Mn, V, Cr, Fe, Co, Ni, Al and B, and M': at least one selected from Ge, Ru, Sn, Ti, Nb and Pt).

However, in a battery using this positive electrode active material, improvement in safety has not been sufficient. Specifically, an addition ratio of the element Me in the transition metal is approximately 14 atm %, and there exist oxygen atoms not bonded to the element Me. The chemical bond between the oxygen atoms and the element Me is strong, and chemical bond cleavage (oxygen desorption) hardly occurs. That is, the oxygen atoms not bonded to the element Me contained in the positive electrode active material of Patent Literature 7 become oxygen gas when the battery is formed, resulting in degradation in safety of the battery.

Patent Literature 8 describes a positive electrode active material for a lithium-ion battery, represented by $Li_xNi_{1-y}M_yO_{2+\alpha}$ (M: at least one selected from Sc, Ti, V, Cr, Mn, Fe, Co, Cu, Zn, Ga, Ge, Al, Bi, Sn, Mg, Ca, B and Zr, $0.9 \leq x \leq 1.2$, $0 < y \leq 0.7$, $\alpha > 0.1$). When a ratio of peak intensity of (003) plane to a peak intensity of (104) plane is 0.9 or less in powder X-ray diffraction (XRD), incorporation of Ni ion into Li ion site (cation mixing) is restricted to achieve a high capacity.

However, it is difficult to sufficiently restrict degradation in safety caused by an increase in charging capacity.

Patent Literature 1: JP 2007-188703 A

Patent Literature 2: JP 2008-127233 A (corresponding to US 2008/116418 A1)

Patent Literature 3: JP 2001-345101 A (corresponding to US 2005/0191551 A1 and US 2002/0012842 A1)

Patent Literature 4: JP 2001-250551A (corresponding to US 2001/0024753 A1)

Patent Literature 5: Japanese Patent No. 3782058 B (corresponding to US 2003/0013017 A1)

Patent Literature 6: JP 2006-202702 A

Patent Literature 7: U.S. Pat. No. 8,734,994 B1

Patent Literature 8: JP WO2011/096522 A1 (corresponding to US2012/0292562 A1)

Non Patent Literature 1: Seung-Taek Myung, and five others, "Synthesis of LiNi0.5Mn0.5−xTixO2 by an Emulsion Drying Method and Effect of Ti on Structure and Electrochemical Properties", Chemistry of Materials, 2005, vol. 17, p. 2427-2435

Non Patent Literature 2: R. Dominko Li2MSiO4 (M=Fe and/or Mn) cathode materials, Journal of Power Sources, 2008, vol. 184, p. 462-468

SUMMARY

It is an object of the present disclosure to provide a positive electrode material, a positive electrode for a non-aqueous electrolyte secondary battery, and a non-aqueous electrolyte secondary battery, which are capable of reducing destruction of a crystal structure during charge/discharge and are excellent in safety.

According to a first aspect of the present disclosure, a positive electrode material includes $Li_2Ni_\alpha M^1_\beta M^2_\gamma Mn_\eta O_{4-\in}$, in which: $\alpha$ satisfies a relation of $0.50 < \alpha \leq 1.33$; $\beta$ satisfies a relation of $0 \leq \beta < 0.67$; $\gamma$ satisfies a relation of $0.33 \leq \gamma \leq 1.1$; $\eta$ satisfies a relation of $0 \leq \eta \leq 1.00$; $\in$ satisfies a relation of $0 \leq \in \leq 1.00$; $M^1$ represents at least one selected from Co and Ga.; and $M^2$ represents at least one selected from Ge, Sn and Sb. The positive electrode material has a layered structure including a Li layer and a Ni layer, and a Ni—O bond length is shorter than that calculated from the Shannon's ionic radii.

According to a second aspect of the present disclosure, a positive electrode for a non-aqueous electrolyte secondary battery includes the positive electrode material according to the first aspect.

According to a third aspect of the present disclosure, a non-aqueous electrolyte secondary battery includes a positive electrode that includes the positive electrode material according to the first aspect.

The above positive electrode material includes Ni in its composition. This Ni is located at the center of the oxygen octahedral coordinated site. As a result, stable charge/discharge is performed. Further, a large amount of Ni as a redox species is contained in the range of $0.50 < \alpha \leq 1.33$, thus leading to achievement of high capacity.

Moreover, large amounts of the $M^1$ element and the $M^2$ element are included, thereby to further stabilize the crystal structure and reduce destruction of the crystal structure during charge/discharge. As a result, a decrease in battery capacity is reduced. The $M^2$ element strongly fixes oxygen. This results in reduction in desorption of oxygen which is concerned at the time of thermal-runaway, thus leading to further improvement in safety of the battery. Moreover, when the amount of the $M^2$ element is 0.33 or larger, on average, all oxygen in the Ni layer are adjacent to the $M^2$ element and bonded to the $M^2$ element, thus significantly enhancing the effect to reduce oxygen desorption.

By having the layered structure that includes the Li layer and the Ni layer, the positive electrode material is excellent in conductivity of Li ions. It is to be noted that the Li layer is a layer formed with Li as a main component, and is a layer substantially composed of Li. The Ni layer is a layer formed with Ni (Ni compound) as a main component, and is substantially a layer containing Ni, the $M^1$ element, and the $M^2$ element as main components.

In the above positive electrode material, the Ni—O bond length is shorter than that calculated from the Shannon's Ionic Radii. In this case, all oxygen atoms can be adjacent to the $M^2$ element.

As described above, the positive electrode material according to the first aspect and the positive electrode including the positive electrode material according to the second aspect provide the non-aqueous electrolyte secondary battery that is capable of suppressing the reduction in battery performance and is excellent in safety.

According to a fourth aspect of the present disclosure, a positive electrode material includes $Li_2Ni_\alpha M^1_\beta M^2_\gamma Mn_\eta O_{4-\in}$, in which: $\alpha$ satisfies a relation of $0.50 < \alpha \leq 1.33$; $\beta$ satisfies a relation of $0 \leq \beta < 0.67$; $\gamma$ satisfies a relation of $0.33 \leq \gamma \leq 1.1$; $\eta$ satisfies a relation of $0 \leq \eta \leq 1.00$; $\in$ satisfies a relation of $0 \leq \in \leq 1.00$; $M^1$ represents at least one selected from Co and Ga.; and $M^2$ represents at least one selected from Ge, Sn and Sb. The positive electrode material has a peak intensity ratio $(I_{103}/I_{104})$ of 0.9 or more in powder X-ray diffraction indexed with a space group R3m. The peak intensity ratio $(I_{103}/I_{104})$ is a ratio of peak intensity $(I_{103})$ of (003) reflection to a peak intensity $(I_{104})$ Of (104) reflection.

According to a fifth aspect of the present disclosure, a positive electrode for a non-aqueous electrolyte secondary battery includes the positive electrode material according to the fourth aspect.

According to a sixth aspect of the present disclosure, a non-aqueous electrolyte secondary battery includes a positive electrode that includes the positive electrode material according to the fourth aspect.

The above positive electrode material includes Ni in its composition. This Ni forms a local structure with 6-coordinated oxygen (O). As a result, stable charge/discharge is performed. Further, a large amount of Ni as a redox species is contained in the range of $0.50 < \alpha \leq 1.33$, thus leading to achievement of high capacity.

Moreover, large amounts of the $M^1$ element and the $M^2$ element are included, thereby to further stabilize the crystal structure and reduce destruction of the crystal structure during charge/discharge. As a result, a decrease in battery capacity is reduced. The $M^2$ element strongly fixes oxygen. This results in reduction in desorption of oxygen which is concerned at the time of thermal-runaway, thus leading to further improvement in safety of the battery. Moreover, when the amount of the $M^2$ element is 0.33 or larger, on average, all oxygen in the Ni layer are adjacent to the $M^2$ element and bonded to the $M^2$ element, thus significantly enhancing the effect to reduce oxygen desorption.

By having the layered structure that includes the Li layer and the Ni layer, the positive electrode material is excellent in conductivity of Li ions. It is to be noted that the Li layer is a layer formed with Li as a main component, and is a layer substantially composed of Li. The Ni layer is a layer formed with Ni (Ni compound) as a main component, and is substantially a layer containing Ni, the $M^1$ element, and the $M^2$ element as main components.

The above positive electrode material has the peak intensity ratio ($I_{003}/I_{104}$) being 0.9 or more. This peak intensity ratio indicates the mixing ratio of Ni ions and Li ions in the Li layer caused by the ion replacement during battery operations, so-called cation mixing. Since the positive electrode material has the peak intensity ratio of 0.9 or more, the cation mixing would be small for achieving high capacity.

As described above, the positive electrode material according to the fourth aspect and the positive electrode including the positive electrode material according to the fifth aspect provide the non-aqueous electrolyte secondary battery that is capable of suppressing the reduction in battery performance and is excellent in safety.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The present inventors focused on a structure of a positive electrode material, and found that the issues described above are solved by a positive electrode material which contains a large amount of $M^2$ element having high bonding strength to oxygen, in addition to Ni element, and has a Ni—O bond length shorter than that calculated from the Shannon's ionic radii.

The present inventors also found that the issues described above are solved by a positive electrode material which contains a large amount of $M^2$ element having high bonding strength to oxygen, in addition to Ni element, and which is configured to suppress a cation mixing.

In an embodiment, a positive electrode material includes $Li_2Ni_\alpha M^1_\beta M^2_\gamma Mn_\eta O_{4-\epsilon}$, in which: $\alpha$ satisfies a relation of $0.50<\alpha\leq 1.33$; $\beta$ satisfies a relation of $0\leq\beta<0.67$; $\gamma$ satisfies a relation of $0.33\leq\gamma\leq 1.1$; $\eta$ satisfies a relation of $0\leq\eta\leq 1.00$; $\epsilon$ satisfies a relation of $0\leq\epsilon\leq 1.00$; $M^1$ represents at least one selected from Co and Ga.; and $M^2$ represents at least one selected from Ge, Sn and Sb. The positive electrode material has a layered structure including a Li layer and a Ni layer, and Ni—O bond length is shorter than that calculated from the Shannon's ionic radii.

The above positive electrode material includes Ni in its composition. This Ni is located at the center of the oxygen octahedral coordinated site. As a result, charge/discharge proceed with no degradation. Further, a large amount of Ni as a redox species is contained in the range of $0.50<\alpha\leq 1.33$, thus leading to achievement of high capacity.

Moreover, large amounts of the $M^1$ element and the $M^2$ element are included, thereby to further stabilize the crystal structure and reduce destruction of the crystal structure during charge/discharge. As a result, a decrease in battery capacity is reduced. The $M^2$ element strongly fixes oxygen. This results in reduction in desorption of oxygen which is concerned at the time of thermal-runaway, thus leading to further improvement in safety of the battery. Moreover, when the amount of the $M^2$ element is 0.33 or larger, on average, all oxygen in the Ni layer are adjacent to the $M^2$ element and bonded to the $M^2$ element, thus significantly enhancing the effect to reduce oxygen desorption.

By having the layered structure that includes the Li layer and the Ni layer, the positive electrode material is excellent in conductivity of Li ions. It is to be noted that the Li layer is a layer formed with Li as a main component, and is a layer substantially composed of Li. The Ni layer is a layer formed with Ni (Ni compound) as a main component, and is substantially a layer containing Ni, the $M^1$ element, and the $M^2$ element as main components.

In the above positive electrode material, Ni—O bond length is shorter than that calculated from the Shannon's Ionic Radii. In this case, it is structured as all oxygen atoms are adjacent to $M^2$ element.

When the positive electrode material described above and the positive electrode including the positive electrode material described above are used in a non-aqueous electrolyte secondary battery, the reduction in battery performance is suppressed and the improvement of safety is achieved.

In an embodiment, a positive electrode material includes $Li_2Ni_\alpha M^1_\beta M^2_\gamma Mn_\eta O_{4-\epsilon}$, in which: $\alpha$ satisfies a relation of $0.50<\alpha\leq 1.33$; $\beta$ satisfies a relation of $0\leq\beta<0.67$; $\gamma$ satisfies a relation of $0.33\leq\gamma\leq 1.1$; $\eta$ satisfies a relation of $0\leq\eta\leq 1.00$; $\epsilon$ satisfies a relation of $0\leq\epsilon\leq 1.00$; $M^1$ represents at least one selected from Co and Ga.; and $M^2$ represents at least one selected from Ge, Sn and Sb. The positive electrode material has a peak intensity ratio ($I_{103}/I_{104}$) of 0.9 or more in powder X-ray diffraction indexed with a space group R3m. The peak intensity ratio ($I_{103}/I_{104}$) is a ratio of peak intensity ($I_{103}$) of (003) reflection to a peak intensity ($I_{104}$) of (104) reflection.

The positive electrode material contains Ni in its composition. This Ni is located at the center of the oxygen octahedral coordinated site. As a result, stable charge/discharge is performed. Further, a large amount of Ni as a redox species is contained in the range of $0.50<\alpha\leq 1.33$, thus leading to achievement of high capacity.

Moreover, large amounts of the $M^1$ element and the $M^2$ element are contained, thereby to further stabilize the crystal structure and reduce destruction of the crystal structure during charge/discharge. As a result, a decrease in battery capacity is reduced. The $M^2$ element strongly fixes oxygen. This results in reduction in desorption of oxygen which is concerned at the time of thermal-runaway, thus leading to further improvement in safety of the battery. Moreover, when the amount of the $M^2$ element is 0.33 or larger, on average, all oxygen in the Ni layer are adjacent to the $M^2$ element and bonded to the $M^2$ element, thus significantly enhancing the effect to reduce the oxygen desorption.

By having the layered structure that includes the Li layer and the Ni layer, the positive electrode material can be excellent in conductivity of Li ions. It is to be noted that the Li layer is a layer formed with Li as a main component, and is a layer substantially composed of Li. The Ni layer is a layer formed with Ni (Ni compound) as a main component, and is substantially a layer containing Ni, the $M^1$ element, and the $M^2$ element as main components.

The positive electrode material has the peak intensity ratio $(I_{003}/I_{104})$ being 0.9 or more. This peak intensity ratio indicates incorporation of Ni ions (Ni element) of the Ni layer into the Li layer, which is so-called a cation mixing. When the peak intensity ratio is 0.9 or more, the cation mixing is further suppressed.

As described above, when the positive electrode material and the positive electrode including the positive electrode material are used in a non-aqueous electrolyte secondary battery, the reduction of the battery performance can be suppressed, and the improvement of safety is achieved.

Further, the positive electrode material having the Ni—O bond length shorter than that calculated from the Shannon's ionic radii may also have the peak intensity ratio $(I_{103}/I_{104})$ of 0.9 or more. In this case, the similar effects can be achieved.

Hereinafter, embodiments of the present disclosure will be described more in detail.

First Embodiment

Figure 1:
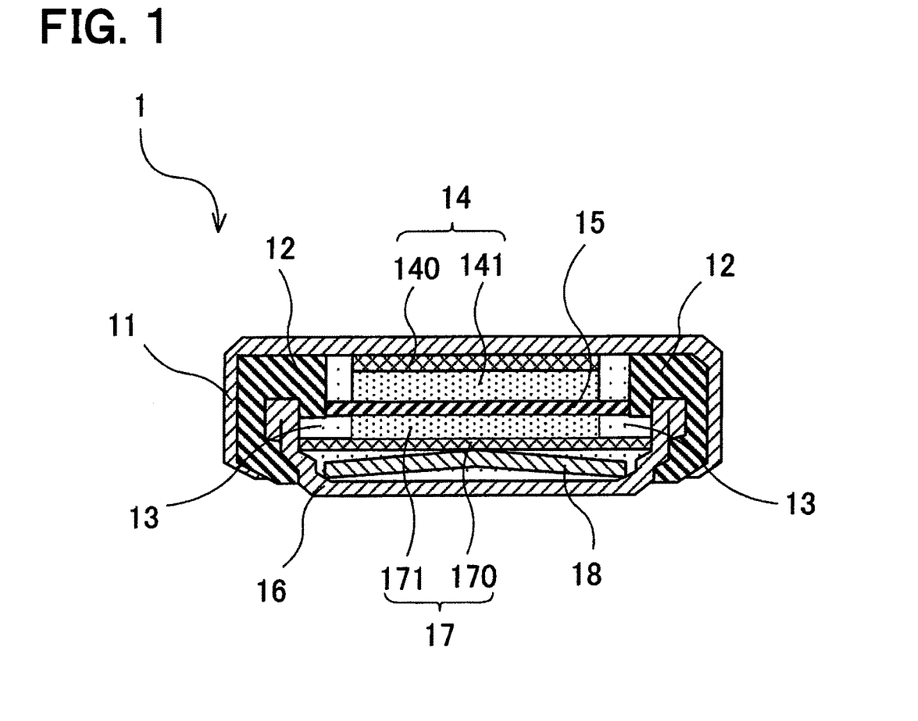
FIG. 1 is a schematic sectional view showing a configuration of a coin type lithium-ion secondary battery according to a first embodiment of the present disclosure.

In a first embodiment, a non-aqueous electrolyte secondary battery is, for example, a coin type lithium-ion secondary battery 1, as shown in FIG. 1. The lithium-ion secondary battery 1 has a positive electrode (positive electrode for a non-aqueous electrolyte secondary battery). The positive electrode includes a positive electrode material of the present disclosure as a positive electrode active material.

The lithium-ion secondary battery 1 of the present embodiment includes a positive electrode case 11, a sealing member 12 (gasket), a non-aqueous electrolyte 13, a positive electrode 14, a positive electrode current collector 140, a positive electrode mixture layer 141, a separator 15, a negative electrode case 16, a negative electrode 17, a negative electrode current collector 170, a negative electrode mixture layer 171, a holding member 18, and the like.

The positive electrode 14 of the lithium-ion secondary battery 1 of the present embodiment includes the positive electrode mixture layer 141 containing the positive electrode active material formed of the positive electrode material of the present embodiment. The positive electrode mixture layer 141 includes, as necessary, a member such as a binder or a conductive material, other than the positive electrode active material.

(Positive Electrode Material)

The positive electrode material is represented by $Li_2Ni_\alpha M^1_\beta M^2_\gamma Mn_\eta O_{4-\epsilon}$ (0.50<α≤1.33, 0.33≤γ≤1.1, 0≤η≤1.00, 0≤β<0.67, 0≤ϵ≤1.00, $M^1$: at least one selected from Co, and Ga, $M^2$: at least one selected from Ge, Sn, and Sb).

The positive electrode material contains Ni in its composition. This Ni is located at the center of the oxygen octahedral coordinated site (6-coordinated local structure). As a result, stable charge/discharge is performed. A large amount of Ni as a redox species is contained in the range of 0.50<α≤1.33, thus leading to achievement of high capacity.

Moreover, a large amount of the $M^1$ element and a large amount of the $M^2$ element are contained, thereby to further stabilize the crystal structure and keep the crystal structure during the charge/discharge. As a result, a decrease in battery capacity is reduced. The $M^1$ element is a trivalent element, and addition of the $M^1$ element is expected to reduce incorporation of Li, a valence number of which is largely different, into the Ni layer. The $M^2$ element strongly fixes oxygen. This results in reduction in desorption of oxygen which is concerned at the time of thermal-runaway, thus leading to further improvement in safety of the battery. Moreover, when the amount of the $M^2$ element is 0.33 or larger, on average, all oxygen in the Ni layer are adjacent to the $M^2$ element and bonded to the $M^2$ element, thus significantly enhancing the effect to reduce the oxygen desorption.

It is preferable that the $M^1$ element as well as the $M^2$ element are located at the center of the oxygen octahedral coordinated site. In this case, a structural gap from the adjacent transition metal element (Ni or Mn coordinated structural body) can be reduced, resulting in the improvement of durability.

The positive electrode material may contain Mn (in a range from 0 to 1.00), which is a transition metal, in its composition. Similar to Ni, Mn forms a octahedral coordination with oxygen (6-coordinated local structure). When Mn is contained in this range, an effect of stabilizing the Ni layer is exerted.

When a non-aqueous electrolyte secondary battery (lithium ion battery) is overcharged, a malfunction may occur. Occurrence of the malfunction in this battery is greatly influenced by oxygen which is released from the positive electrode active material (positive electrode material) in the process to the occurrence. Specifically, electrons are taken from oxygen of the positive electrode active material during charge, thus making oxygen apt to be released. The $M^2$ element is added in the positive electrode material of the present disclosure, and the added $M^2$ element is bonded more strongly to oxygen than Ni or Mn (transition metal). That is, addition of the $M^2$ element can reduce oxygen desorption during charge/discharge to the minimum.

The positive electrode material of the present embodiment has a layered structure including the Li layer and the Ni layer. With this configuration, the positive electrode has excellent conductivity of Li ions. It is to be noted that the Li layer is a layer formed with Li as a main component, and is a layer substantially composed of Li. The Ni layer is a layer formed with Ni (Ni compound) as a main component, and is substantially a layer containing Ni, the $M^1$ element, and $M^2$ element as main components.

In the positive electrode material of the present embodiment, a Ni—O bond length can be known using a conventional crystal structure analytical method (device). For example, a local structure of the positive electrode material is preferably determined by an X-ray absorption fine structure (XAFS) analytical method. Hereinafter, a general XAFS analytical method will be briefly described.

In observation of absorbance of a substance with the change of an incident X-ray energy, the absorbance indicates a sharp increase (absorption edge) when the incident X-ray energy is equal to a core level of the atom constituting the substance to be measured. After the sharp increase, the smooth attenuation of the absorbance is observed with an increase in the incident X-ray energy. When this spectrum is examined in detail, a spectrum structure having a large change exists near the absorption edge. In a high energy region higher than the absorption edge, a spectrum structure having a small and smooth oscillation structure exists.

The former structure is referred to as an X-ray absorption near edge structure (XANES) and the later structure is referred to as an extended X-ray absorption fine structure (EXAFS). The XAFS is the general term of the XANES and the EXAFS.

The spectrum structure of the XANES reflects the density in an unoccupied state of the element to be measured so as to correspond to transition from the core level to various unoccupied levels of the atom constituting the substance to be measured.

On the other hand, the spectrum structure of the EXAFS is caused by an interference effect of electrons emitted outside of the atom by the incident X-ray and electrons scattered by peripheral atoms. Therefore, the spectrum structure of the EXAFS reflects information, such as the number (coordination number of the atom to be measured), types and distance (bond length) of atoms on a periphery of the atom to be measured, and the like The present inventors analyzed the spectrum structure of the EXAFS and identified the bond length of Ni and oxygen atom.

The EXAFS oscillation ($\chi(k)$) is expressed by the following equation (1) based on a plane-wave single-scattering theory:

[Ex. 1]

$$x(k) = S_0^2 \sum_i \frac{N_i F_i(ki)}{k_i r_i^2} e^{-2ki\sigma_i^2} \sin(2kir_i + \varphi_i(ki)) \quad (1)$$

In the equation (1), index i indicates a number of a coordination area, $S_0^2$ indicates a reduction factor, $N_i$ indicates the number of atoms of the i-th coordination area, $F_i(ki)$ indicates a back scattering intensity, $k_i$ indicates a wavenumber, $r_i$ indicates a bonding distance, $\sigma_i$ indicates Debye-Waller (DW) factor, $\varphi_i(ki)$ indicates a phase shift.

In general, amplitude of the EXAFS oscillation ($\chi(k)$) reduces with the decrease in the atom number ($N_i$) of each coordination area. According to the equation (1), it is appreciated that information on the atom having a shorter bonding distance ($r_i$) with the atom to be measured is more reflected on the EXAFS oscillation ($\chi(k)$).

Further, an EXAFS function is obtained by weighting the EXAFS oscillation ($\chi(k)$) with k3 to strengthen the oscillation on a high frequency side. The EXAFS function (k3$\chi(k)$) obtained is subjected to Fourier transformation in a range of 3<k≤12 to obtain a radial distribution function as one-dimensional distance information from the center of Ni element. The present inventors calculated the bond length from the center of the Ni element to the oxygen atom based on the radial distribution function.

The positive electrode active material includes the positive electrode material described above as the positive electrode active material. The positive electrode active material may further include another positive electrode active material (positive electrode material), which may be included in the chemical formula described above or may be further another compound.

(Configuration Other than Positive Electrode Active Material)

The lithium-ion secondary battery 1 of the present embodiment can be configured similarly to the conventional lithium-ion secondary battery except for the use of the above positive electrode material as the positive electrode active material.

In the positive electrode 14, the positive electrode mixture layer 141 is formed by applying, to the positive electrode current collector 140, a positive electrode mixture obtained by mixing the positive electrode active material, a conductive material, and a binder.

The conductive material ensures electrical conductivity of the positive electrode 14. Examples of the conductive material to be used may include, but are not limited to, fine particles of graphite, acetylene black, Ketjen black, carbon black such as carbon nanofiber, fine particles of amorphous carbon such as needle coke.

The binder binds positive electrode active material particles or the conductive material. Examples of the binder to be used may include, but are not limited to, polyvinylidene fluoride (PVDF), ethylene-propylene-diene rubber (EPDM), styrene-butadiene rubber (SBR), nitrile rubber (NBR), fluoro-rubber, and the like.

The positive electrode mixture is dispersed in a solvent and applied to the positive electrode current collector 140. As the solvent, normally, an organic solvent for dissolving the binder is used. Examples of the solvent may include, but are not limited to, N-methyl-2-pyrrolidone (NMP), dimethylformamide, dimethylacetamide, methyl ethyl ketone, cyclohexanone, methyl acetate, methyl acrylate, diethyltriamine, N,N-dimethylaminopropylamine, ethylene oxide, and tetrahydrofuran. Further, a dispersant, a thickener or the like may be added to water to form the positive electrode active material into a slurry with polytetrafluoroethylene (PTFE) or the like.

Examples of the positive electrode current collector 140 to be used may include, but are not limited to, products obtained by processing a metal such as aluminum or stainless, specifically a foil processed into a sheet, net, punched metal, or a formed metal.

(Non-Aqueous Electrolyte)

The non-aqueous electrolyte 13 obtained by dissolving a supporting electrolyte into an organic solvent is used.

The kind of the supporting electrolyte of the non-aqueous electrolyte 13 is not particularly limited to, but is preferably one of inorganic salts selected from $LiPF_6$, $LiBF_4$, $LiClO_4$, and $LiAsF_6$, derivatives of these inorganic salts, organic salts selected from $LiSO_3CF_3$, $LiC(SO_3CF_3)_3$, $LiN(SO_2CF_3)_2$, $LiN(SO_2C_2F_5)_2$, and $LiN(SO_2CF_3)(SO_2C_4F_9)$, and derivatives of these organic salts. These supporting electrolytes can make the battery performance more excellent, and can keep the battery performance higher also in a temperature range other than a room temperature. A concentration of the supporting electrolyte is not particularly limited, and it is preferable to appropriately select the concentration in consideration of the kinds of the supporting electrolyte and the organic solvent, according to the use.

The organic solvent (non-aqueous solvent) into which the supporting electrolyte is dissolved is not particularly limited so long as the organic solvent is used for a normal non-aqueous electrolyte. For example, carbonates, halogenated hydrocarbon, ethers, ketones, nitriles, lactones, oxolane compound, or the like can be used. In particular, propylene carbonate, ethylene carbonate, 1,2-dimethoxyethane, dimethyl carbonate, diethyl carbonate, ethyl methyl carbonate, vinylene carbonate, and the like, and mixed solvents of these are suitably used. By particularly using one or more non-aqueous electrolytes selected from the group consisting of carbonates and ethers out of the above cited organic solvents, the solubility, dielectric constant, and viscosity of the supporting electrolyte are made excellent and the charge/discharge efficiency of the battery is made high, which is preferred.

In the lithium-ion secondary battery 1 of the present embodiment, the most preferable non-aqueous electrolyte 13 is obtained by dissolving the supporting electrolyte into the organic solvent.

(Negative Electrode)

As for the negative electrode 17, the negative electrode mixture layer 171 is formed by applying a negative electrode mixture, obtained by mixing a negative electrode active material and a binder, on the surface of the negative electrode current collector 170.

As the negative electrode active material, a conventional negative electrode active material can be used. A negative electrode active material containing at least one element of Sn, Si, Sb, Ge, and C can be cited. Out of these negative electrode active materials, C is preferably a carbon material capable of storing and desorbing electrolytic ions of the lithium-ion secondary battery 1 (a carbon material having a Li storage capacity), and C is more preferably amorphous-coated natural graphite.

Further, out of these negative electrode active materials, particularly, Sn, Sb, and Ge are alloy materials with great changes in volume. These negative electrode active materials may form alloys with other metals, such as Ti—Si, Ag—Sn, Sn—Sb, Ag—Ge, Cu—Sn, and Ni—Sn.

As the conductive material, a carbon material, a metal powder, a conductive polymer, or the like can be used. From the viewpoint of the conductivity and the stability, it is preferable to use a carbon material such as acetylene black, Ketjen black, or carbon black.

Examples of the binder may include polytetrafluoroethylene (PTFE), polyvinylidene fluoride (PVDF), a fluororesin copolymer (for example, tetrafluoroethylene-hexafluoropropylene copolymer (FEP)), styrene-butadiene rubber (SBR), acrylic rubber, fluoro-rubber, polyvinyl alcohol (PVA), styrene-maleic acid resin, sodium polyacrylate, and carboxylmethyl cellulose (CMC).

Examples of the solvent may include an organic solvent such as N-methyl-2-pyrrolidone (NMP), and water.

As the negative electrode current collector 170, it is possible to use a conventional current collector, and is possible to use a product obtained by processing a metal such as copper, stainless, titanium, and nickel, specifically foil processed into a sheet, a net, a punched metal or a formed metal, but these are not restrictive.

(Other Configurations)

The positive electrode case 11 and the negative electrode case 16 seal built-in components by using the insulating sealing member 12. The built-in components include the non-aqueous electrolyte 13, the positive electrode 14, the separator 15, the negative electrode 17, the holding member 18, and the like.

The positive electrode mixture layer 141 comes into surface contact with the positive electrode case 11 via the positive electrode current collector 140, to make electrical conduction. The negative electrode mixture layer 171 comes into surface contact with the negative electrode case 16 via the negative electrode current collector 170.

The separator 15 interposed between the positive electrode mixture layer 141 and the negative electrode mixture layer 171 electrically insulates the positive electrode mixture layer 141 and the negative electrode mixture layer 171, and holds the non-aqueous electrolyte 13. As the separator 15, for example, a porous synthetic resin film, especially a porous film of a polyolefin polymer (polyethylene, polypropylene) is used. The separator 15 is molded into a larger size than sizes of the two mixture layers 141, 171 so as to ensure electrical insulation between the two mixture layers 141, 171.

The holding member 18 serves to hold the positive electrode current collector 140, the positive electrode mixture layer 141, the separator 15, the negative electrode mixture layer 171, and the negative electrode current collector 170 at regular positions. The use of an elastic member such as an elastic piece or a spring facilitates holding of those at the regular positions.

The lithium-ion secondary battery 1 of the present embodiment has the coin shape as described above, but the shape is not particularly limited. The lithium-ion secondary battery can be a battery in a variety of shapes such as a cylindrical shape and a prismatic shape, or an irregularly shaped battery sealed in a laminated exterior body.

(Manufacturing Method)

A manufacturing method for the positive electrode material of the present embodiment is not limited so long as the positive electrode material has the above configuration. Examples of the manufacturing method may include a solid-phase synthesis method, a co-precipitation synthesis method, a hydrothermal synthesis method, a polymerized complex synthesis method, a method through ion exchange, a synthesis method by high temperature and high pressure treatment, a sol-gel method, a spray dry method, and a supercritical method. Also, the examples of the manufacturing method may include a method of using these methods solely or in combination.

Examples of First Embodiment

Hereinafter, examples of the first embodiment will be described more in detail.

As examples for specifically describing the first embodiment, a positive electrode material (positive electrode active material), and a positive electrode and a lithium-ion secondary battery using the positive electrode material were manufactured. In the examples, the lithium-ion secondary battery shown in FIG. 1 was manufactured.

Example 1-1

First, $Na_2NiSnO_4$ as a starting material was manufactured. Specifically, a compound containing one or more elements of Na, Ni, and Sn was weighed and mixed such that these elements were at a predetermined atomic ratio. Then, the compound was sintered (in an atmosphere), to obtain the starting material having an almost single-phase crystal structure.

Subsequently, the obtained $Na_2NiSnO_4$ was heated in a molten salt composed of lithium nitrate and lithium chloride, to carry out ion-exchange treatment.

In the above manner, a positive electrode material ($Li_2NiSnO_4$ powder) of the example 1-1 was manufactured.

Figure 2:
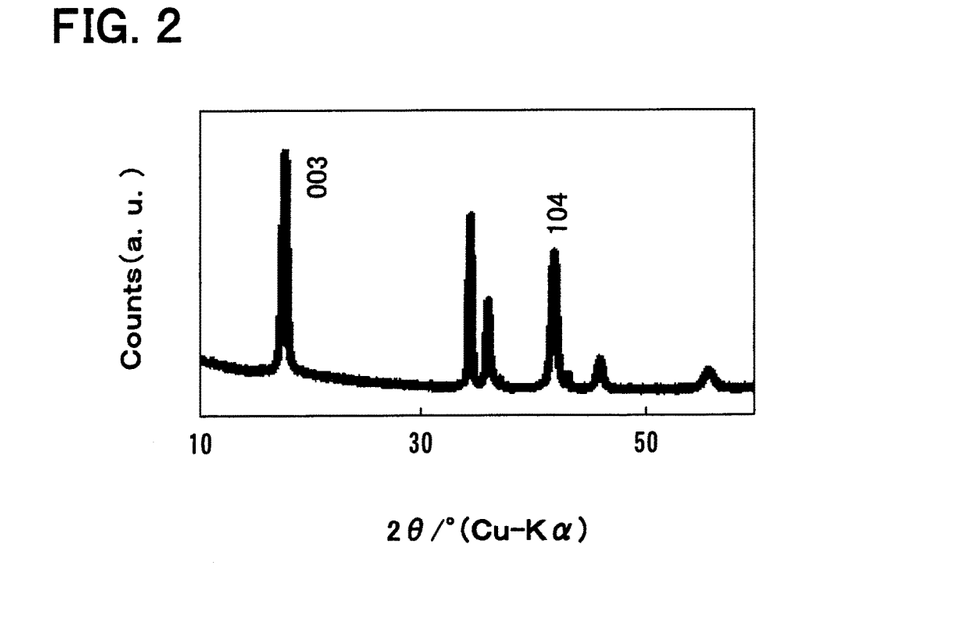
FIG. 2 is a graph showing a measurement result of a powder XRD of a positive electrode material of an example 1-1.

When the manufactured $Li_2NiSnO_4$ powder was observed by powder XRD, the result shown in FIG. 2 was obtained.

According to the result shown in FIG. 2, it was confirmed that the powder was an almost single-phase compound.

Example 1-2

Aqueous solutions containing respective metal complexes of Li, Ni, Mn and Ge were prepared. The obtained complex solutions were mixed such that a composition ratio thereof was a composition ratio of a target positive electrode material, namely, an atomic ratio of Li:Ni:Mn:Ge was 2.1:1:0.67:0.33.

The obtained mixed solution was dried in a drying oven to remove an organic component by heating treatment, and was then heated and sintered.

In the above manner, a positive electrode material ($Li_{2.1}NiMn_{0.67}Ge_{0.33}O_4$ powder) of the example 1-2 was manufactured.

When the manufactured $Li_{2.1}NiMn_{0.67}Ge_{0.33}O_4$ powder was observed by powder XRD, it was confirmed that the powder was an almost single-phase compound.

Example 1-3

Similarly to the starting material of the example 1-1, an almost single phase $Na_2NiMn_{0.67}Ge_{0.33}O_4$ was manufactured.

Subsequently, the obtained $Na_2NiMn_{0.67}Ge_{0.33}O_4$ was subjected to the ion-exchange treatment in a similar manner to the case of the example 1-1.

In the above manner, a positive electrode material ($Li_2NiMn_{0.67}Ge_{0.33}O_4$ powder) of the example 1-3 was manufactured.

When the manufactured positive electrode material was observed by powder XRD, it was confirmed that the powder was an almost single-phase compound.

Example 1-4

In a similar manner to the case of the example 1-2, a positive electrode material ($Li_{2.1}NiMn_{0.67}Sn_{0.33}O_4$ powder) of the example 1-4 was manufactured from aqueous solutions containing respective metal complexes.

When the manufactured positive electrode material was observed by powder XRD, it was confirmed that the powder was an almost single-phase compound.

Example 1-5

Similarly to the starting material of the example 1-1, an almost single phase $Na_2NiMn_{0.67}Sn_{0.33}O_4$ was manufactured.

Subsequently, the obtained $Na_2NiMn_{0.67}Sn_{0.33}O_4$ was subjected to the ion-exchange treatment in a similar manner to the case of the example 1-1.

In the above manner, a positive electrode material ($Li_2NiMn_{0.67}Sn_{0.33}O_4$ powder) of the example 1-5 was manufactured.

When the manufactured $Li_2NiMn_{0.67}Sn_{0.33}O_4$ powder was observed by powder XRD, it was confirmed that the powder was an almost single-phase compound.

Example 1-6

A positive electrode material of the example 1-6 is $Li_2NiGeO_4$ powder. This composition was confirmed by an ICP analysis.

When the $Li_2NiGeO_4$ powder as the positive electrode material of the example 1-6 was observed by powder XRD, it was confirmed that the powder was an almost single-phase compound and has a layered rock-salt crystal structure.

Comparative Example 1-1

In a similar manner to the case of the example 1-2, a positive electrode material ($Li_{2.1}NiTiO_4$ powder) of a comparative example 1-1 was manufactured from aqueous solutions containing respective metal complexes.

When the manufactured $Li_{2.1}NiTiO_4$ powder was observed by powder XRD, it was confirmed that the powder was an almost single-phase compound.

Comparative Example 1-2

In a similar manner to the case of the comparative example 1-1, a positive electrode material ($Li_{2.1}NiMn_{0.33}Ti_{0.67}O_4$ powder) of a comparative example 1-2 was manufactured from aqueous solutions containing respective metal complexes.

When the manufactured $Li_{2.1}NiMn_{0.33}Ti_{0.67}O_4$ powder was observed by powder XRD, it was confirmed that the powder was an almost single-phase compound.

Comparative Example 1-3

In a similar manner to the case of the comparative example 1-1, a positive electrode material ($Li_{1.05}NiO_2$ powder) of a comparative example 1-3 was manufactured from aqueous solutions containing respective metal complexes.

When the manufactured $Li_{1.05}NiO_2$ powder was observed by powder XRD, it was confirmed that the powder was an almost single-phase compound.

<Evaluation>

As evaluation of the positive electrode material of each example above, a lithium-ion secondary battery was assembled, charge/discharge characteristics were measured. Further, after measurement of the charge/discharge characteristics, the coin type battery was disassembled and the positive electrode was taken out, to evaluate the safety.

(Lithium-Ion Secondary Battery)

Using the positive electrode active material of each example above, a test cell (2032 coin type half cell) made of the lithium-ion secondary battery was assembled, to perform evaluation.

(Coin Type Half Cell)

A test cell (coin type half cell) has a similar configuration to that of the coin type lithium-ion secondary battery 1, the configuration of which was shown in FIG. 1.

As the positive electrode, there was used a positive electrode with the positive electrode mixture layer 141 formed by applying a positive electrode mixture, obtained by mixing 91 parts by mass of the positive electrode active material (positive electrode active material of each example), 2 parts by mass of acetylene black, and 7 parts by mass of PVDF, to the positive electrode current collector 140 made of aluminum foil.

As the negative electrode (counter electrode), metallic lithium was used. This corresponds to the negative electrode mixture layer 171 in FIG. 1.

The non-aqueous electrolyte 13 was prepared by dissolving $LiPF_6$ into a mixed solvent of 30 vol % of ethylene carbonate (EC) and 70 vol % of diethyl carbonate (DEC) such that 1 mol/l of $LiPF_6$ was contained.

After being assembled, the test cell was subjected to activation treatment by ⅓ C×2 cycles of charge/discharge.

In the above manner, the test cell (half cell) of each example was manufactured.

<Charge/Discharge Characteristics>

The lithium-ion secondary battery was charged and discharged at the rate of 1/50 C. The charge was performed by CC charge with 4.5 V cut off, and the discharge was performed by CC discharge with 2.6 V cut off.

Figure 3:
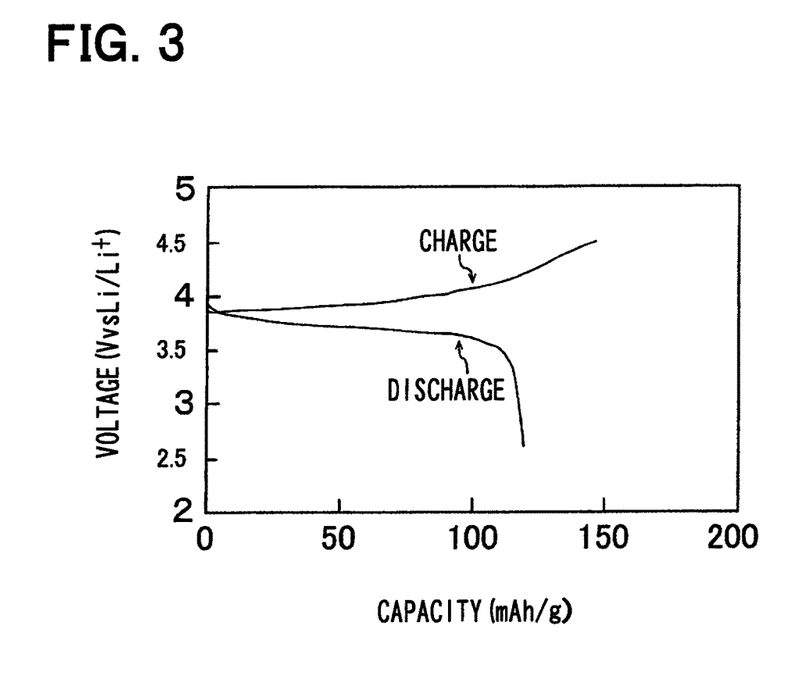
FIG. 3 is a graph showing charge and discharge characteristics of the example 1-1.

Table 1 shows measurement results of a charging capacity and a discharging capacity of the lithium-ion secondary batteries of the examples (Examples 1-1 to 1-6, Comparative Examples 1-1 to 1-3). FIG. 3 shows charge/discharge characteristics of the lithium ion secondary battery of the example 1-1.

TABLE 1

|  | Positive electrode material | | Battery evaluation | | |
| --- | --- | --- | --- | --- | --- |
|  | Chemical formula | Ni—O bond length (Å) | Charging capacity (mAh/g) | Discharging capacity (mAh/g) | Safety test (wt %) |
| Example 1-1 | $Li_2NiSnO_4$ | 1.97 | 140 | 120 | 0.47 |
| Example 1-2 | $Li_{2.1}NiMn_{0.67}Ge_{0.33}O_4$ | 1.94 | 170 | 155 | 0.49 |
| Example 1-3 | $Li_2NiMn_{0.67}Ge_{0.33}O_4$ | 1.94 | 188 | 172 | 0.48 |
| Example 1-4 | $Li_{2.1}NiMn_{0.67}Sn_{0.33}O_4$ | 1.97 | 152 | 140 | 0.62 |
| Example 1-5 | $Li_2NiMn_{0.67}Sn_{0.33}O_4$ | 1.97 | 157 | 146 | 0.59 |
| Example 1-6 | $Li_2NiGeO_4$ | 1.92 | 152 | 141 | 0.58 |
| Comparative Example 1-1 | $Li_{2.1}NiTiO_4$ | — | 38 | 31 | 0.61 |
| Comparative Example 1-2 | $Li_{2.1}NiMn_{0.33}Ti_{0.67}O_4$ | — | 62 | 48 | 0.79 |
| Comparative Example 1-3 | $Li_{1.05}NiO_2$ | — | 172 | 155 | 6.99 |

As shown in Table 1, the secondary batteries of the examples 1-1 to 1-6 have the excellent charging capacity and the discharging capacity compared to those of the comparative examples 1-1 and 1-2.

Further, as shown in FIG. 3, it was confirmed that the secondary battery of the example 1-1 have favorable charge/discharge characteristics.

<Safety Test>

The lithium-ion secondary battery was charged with CC charge at the rate of 1/50 C up to 4.8 V.

After the charge, the battery was disassembled and the positive electrode was taken out.

The positive electrode taken-out was washed by DMC, and then heated in a helium atmosphere from a room temperature to 1000 degrees Celsius (° C.) with a programming rate of 20° C./min. The amount of oxygen generated from the positive electrode at that time was measured by TPD-MS measurement.

Table 1 also shows the measurement results of the amount of oxygen generated.

As shown in Table 1, it is found that the amount of oxygen generated in each example is low as compared with that of the comparative examples 1-2 and 1-3, and thus is excellent in safety.

<Evaluation of Ni—O Bond Length Obtained by EXAFS Analysis>

The bond length of Ni atom and oxygen atom as the nearest atom contained in the positive electrode material obtained in each of the examples 1-1 to 1-6 was identified in the following manner. Table 1 also shows the obtained results. When data was discontinuous or some values were missed, and/or when an improper background processing was performed for the EXAFS analysis, parameters according to the object were set and such cases are considered as in the gist of the present disclosure.

(1) Suitable amounts of the positive electrode material of the example 1-1 and boron nitride were mixed together, and compression-molded to form pellets.

(2) An X-ray absorption measurement in a range from 8032 to 9432 eV was performed by a transmission method.

(3) Data of the measurement results were opened by an analyzing software (Athena (Ver. 0.9.013)) using plug-in for directly loading energy and X-ray absorption amount. Further, background was eliminated and E0 was decided through default algorithm. A range of −150 to −30 eV from E was applied to the pre-edge. Normalization was performed in a range of 150 to 980 eV from E0.

(4) The Fourier transformation is performed in a range of $3<k\leq12$ with Hanning window as a window function to obtain the radial distribution function, which is the one-dimensional distance information from the center of Ni atom in each example. In this time, the phase was not adjusted.

(5) The data that has been subjected to the Fourier transformation is read on an analyzing software (Artemis (Ver. 0.8.012)).

(6) As a fitting condition, a peak corresponding to the first coordination area is set as a fitting target, and 3 is set as k-weight.

(7) To obtain a theoretical EXAFS function considering phase shift or backscattering factor, a software (Atoms) added in an analyzing software (Artemis) was used, and calculation was performed by a model of 6 angstrom (6×10⁻¹⁰ m) cluster size with Ni in Ni/Mn (3b) site of the layered rock-salt type crystal structure $Li_2NiMnO_4$ (CifNo0000000180552) as Core.

(8) Among paths obtained, a path of Ni—O of an element corresponding to the first coordination area is selected. An initial setting is performed to the selected path with amp: 0.1 (guess), coordination number N=6, enot: 0.01 (guess), delr: 0.01 (guess), ss (DW factor): 0.01 (guess), and the fitting of the nearest element was performed.

(9) The R factor obtained was 0.00009. That is, it is appreciated that the analysis was performed at high accuracy. Further, ss was 0.0081 Å2, and enot was 4.41 eV, and amp was 0.88. These values indicate that validity of the analysis result is high. The Ni—O bond length output in this time, that is, the distance from the center of Ni to the oxygen atom was 1.97 angstrom ($1.97\times10^{-10}$ m) as shown in table 1. Since the Ni—O bond length calculated from the Shannon's Ionic Radii is 2.04 angstrom ($2.04\times10^{-10}$ m), it is appreciated that the obtained Ni—O bond length is shorter than the Ni—O bond length calculated from the Shannon's Ionic Radii.

In a similar manner to the case of the example 1-1, the Ni—O bond length of the positive electrode material of each of the examples 1-2 to 1-6 was identified. The results are shown in the table 1. According to the table 1, the Ni—O bond length of the positive electrode material of each of the examples 1-2 to 1-6 was also shorter than that calculated from the Shannon's Ionic Radii.

Second Embodiment

A second embodiment of the present disclosure will be described.

Similarly to the first embodiment, a non-aqueous electrolyte secondary battery of the second embodiment is, for example, a coin type lithium-ion secondary battery 1, as shown in FIG. 1. The lithium-ion secondary battery 1 has a positive electrode (positive electrode for a non-aqueous electrolyte secondary battery). The positive electrode includes a positive electrode material of the present disclosure as a positive electrode active material.

The lithium-ion secondary battery 1 of the second embodiment includes a positive electrode case 11, a sealing member 12 (gasket), a non-aqueous electrolyte 13, a positive electrode 14, a positive electrode current collector 140, a positive electrode mixture layer 141, a separator 15, a negative electrode case 16, a negative electrode 17, a negative electrode current collector 170, a negative electrode mixture layer 171, a holding member 18, and the like.

The positive electrode 14 of the lithium-ion secondary battery 1 of the present embodiment includes the positive electrode mixture layer 141 containing the positive electrode active material formed of the positive electrode material of the present embodiment. The positive electrode mixture layer 141 includes, as necessary, a member such as a binder or a conductive material, other than the positive electrode active material.

(Positive Electrode Material)

The positive electrode material is represented by $Li_2Ni_\alpha M^1_\beta M^2_\gamma Mn_\eta O_{4-\epsilon}$ ($0.50<\alpha\le 1.33$, $0.33\le\gamma\le 1.1$, $0\le\eta\le 1.00$, $0\le\beta<0.67$, $0\le\epsilon\le 1.00$, $M^1$: at least one selected from Co, and Ga, $M^2$: at least one selected from Ge, Sn, and Sb).

The positive electrode material contains Ni in its composition. This Ni forms a local structure with 6-coordinated oxygen (O) (6-coordinated local structure). As a result, stable charge/discharge is performed. A large amount of Ni as a redox species is contained in the range of $0.50<\alpha\le 1.33$, thus leading to achievement of high capacity.

Moreover, a large amount of the $M^1$ element and a large amount of the $M^2$ element are contained, thereby to further stabilize the crystal structure and keep the crystal structure during the charge/discharge. As a result, a decrease in battery capacity is reduced. The $M^1$ element is a trivalent element, and addition of the $M^1$ element is expected to reduce incorporation of Li, a valence number of which is largely different, into the Ni layer. The $M^2$ element strongly fixes oxygen. This results in reduction in desorption of oxygen which is concerned at the time of thermal-runaway, thus leading to further improvement in safety of the battery. Moreover, when the amount of the $M^2$ element is 0.33 or larger, on average, all oxygen in the Ni layer are adjacent to the $M^2$ element and bonded to the $M^2$ element, thus significantly enhancing the effect to reduce the oxygen desorption.

It is preferable that the $M^1$ element as well as the $M^2$ element are in 6-coordinated states. In this case, a structural gap from the adjacent transition metal element (Ni or Mn coordinated structural body) can be reduced, resulting in the improvement of durability.

The positive electrode material may contain Mn (in a range from 0 to 1.00), which is a transition metal, in its composition. Similar to Ni, Mn forms a local structure with 6-coordinated oxygen (O) (6-coordinated local structure). When Mn is contained in this range, an effect of stabilizing the Ni layer is exerted.

When a non-aqueous electrolyte secondary battery (lithium ion battery) is overcharged, a malfunction may occur. Occurrence of the malfunction in this battery is greatly influenced by oxygen which is released from the positive electrode active material (positive electrode material) in the process to the occurrence. Specifically, electrons are taken from oxygen of the positive electrode active material during charge, thus making oxygen apt to be released. The $M^2$ element is added in the positive electrode material of the present disclosure, and the added $M^2$ element is bonded more strongly to oxygen than Ni or Mn (transition metal). That is, addition of the $M^2$ element can reduce oxygen desorption during charge/discharge to the minimum.

The positive electrode material of the present embodiment has a layered structure including the Li layer and the Ni layer. With this configuration, the positive electrode has excellent conductivity of Li ions. It is to be noted that the Li layer is a layer formed with Li as a main component, and is a layer substantially composed of Li. The Ni layer is a layer formed with Ni (Ni compound) as a main component, and is substantially a layer containing Ni, the $M^1$ element, and $M^2$ element as main components.

When the positive electrode material of the present embodiment is measured by a powder X-ray diffraction and indexed with a space group of R3m, a peak intensity ratio ($I_{003}/I_{104}$), which is a ratio of peak intensity ($I_{003}$) of (003) reflection to a peak intensity ($I_{104}$) of (104) reflection, is 0.9 or more. This peak intensity ratio indicates incorporation of Ni ions (Ni element) of the Ni layer into the Li layer, which is so-called a cation mixing. When the cation mixing advances, a diffusion path of lithium is blocked, and stable capacity is not achieved. Since the positive electrode material of the present embodiment has the peak intensity ratio of 0.9 or more, then the cation mixing is suppressed to small ratio.

The cation mixing is more suppressed with an increase in the peak intensity ratio. It is preferable that the peak intensity ratio ($I_{003}/I_{104}$) is 1.2 or more.

The peak intensity ratio may be measured by a generally known powder XRD method, and may be measured using a powder XRD measurement device.

The positive electrode active material includes the positive electrode material described above as the positive electrode active material. The positive electrode active material may further include another positive electrode active material (positive electrode material), which may be included in the chemical formula described above or may be further another compound.

(Configuration Other than Positive Electrode Active Material)

The lithium-ion secondary battery 1 of the present embodiment can be configured similarly to the conventional lithium-ion secondary battery except for the use of the above positive electrode material as the positive electrode active material.

In the positive electrode 14, the positive electrode mixture layer 141 is formed by applying, to the positive electrode current collector 140, a positive electrode mixture obtained by mixing the positive electrode active material, a conductive material, and a binder.

The conductive material ensures electrical conductivity of the positive electrode 14. Examples of the conductive material to be used may include, but are not limited to, fine particles of graphite, acetylene black, Ketjen black, carbon black such as carbon nanofiber, fine particles of amorphous carbon such as needle coke.

The binder binds positive electrode active material particles or the conductive material. Examples of the binder to be used may include, but are not limited to, polyvinylidene fluoride (PVDF), ethylene-propylene-diene rubber (EPDM), styrene-butadiene rubber (SBR), nitrile rubber (NBR), fluoro-rubber, and the like.

The positive electrode mixture is dispersed in a solvent and applied to the positive electrode current collector 140. As the solvent, normally, an organic solvent for dissolving the binder is used. Examples of the solvent may include, but are not limited to, N-methyl-2-pyrrolidone (NMP), dimethylformamide, dimethylacetamide, methyl ethyl ketone, cyclohexanone, methyl acetate, methyl acrylate, diethyltriamine, N,N-dimethylaminopropylamine, ethylene oxide, and tetrahydrofuran. Further, a dispersant, a thickener or the like may be added to water to form the positive electrode active material into a slurry with polytetrafluoroethylene (PTFE) or the like.

Examples of the positive electrode current collector 140 to be used may include, but are not limited to, products obtained by processing a metal such as aluminum or stainless, specifically a foil processed into a sheet, net, punched metal, or a formed metal.

(Non-Aqueous Electrolyte)

The non-aqueous electrolyte 13 obtained by dissolving a supporting electrolyte into an organic solvent is used.

The kind of the supporting electrolyte of the non-aqueous electrolyte 13 is not particularly limited to, but is preferably one of inorganic salts selected from $LiPF_6$, $LiBF_4$, $LiClO_4$, and $LiAsF_6$, derivatives of these inorganic salts, organic salts selected from $LiSO_3CF_3$, $LiC(SO_3CF_3)_3$, $LiN(SO_2CF_3)_2$, $LiN(SO_2C_2F_5)_2$, and $LiN(SO_2CF_3)(SO_2C_4F_9)$, and derivatives of these organic salts. These supporting electrolytes can make the battery performance more excellent, and can keep the battery performance higher also in a temperature range other than a room temperature. A concentration of the supporting electrolyte is not particularly limited, and it is preferable to appropriately select the concentration in consideration of the kinds of the supporting electrolyte and the organic solvent, according to the use.

The organic solvent (non-aqueous solvent) into which the supporting electrolyte is dissolved is not particularly limited so long as the organic solvent is used for a normal non-aqueous electrolyte. For example, carbonates, halogenated hydrocarbon, ethers, ketones, nitriles, lactones, oxolane compound, or the like can be used. In particular, propylene carbonate, ethylene carbonate, 1,2-dimethoxyethane, dimethyl carbonate, diethyl carbonate, ethyl methyl carbonate, vinylene carbonate, and the like, and mixed solvents of these are suitably used. By particularly using one or more non-aqueous electrolytes selected from the group consisting of carbonates and ethers out of the above cited organic solvents, the solubility, dielectric constant, and viscosity of the supporting electrolyte are made excellent and the charge/discharge efficiency of the battery is made high, which is preferred.

In the lithium-ion secondary battery 1 of the present embodiment, the most preferable non-aqueous electrolyte 13 is obtained by dissolving the supporting electrolyte into the organic solvent.

(Negative Electrode)

As for the negative electrode 17, the negative electrode mixture layer 171 is formed by applying a negative electrode mixture, obtained by mixing a negative electrode active material and a binder, on the surface of the negative electrode current collector 170.

As the negative electrode active material, a conventional negative electrode active material can be used. A negative electrode active material containing at least one element of Sn, Si, Sb, Ge, and C can be cited. Out of these negative electrode active materials, C is preferably a carbon material capable of storing and desorbing electrolytic ions of the lithium-ion secondary battery 1 (a carbon material having a Li storage capacity), and C is more preferably amorphous-coated natural graphite.

Further, out of these negative electrode active materials, particularly, Sn, Sb, and Ge are alloy materials with great changes in volume. These negative electrode active materials may form alloys with other metals, such as Ti—Si, Ag—Sn, Sn—Sb, Ag—Ge, Cu—Sn, and Ni—Sn.

As the conductive material, a carbon material, a metal powder, a conductive polymer, or the like can be used. From the viewpoint of the conductivity and the stability, it is preferable to use a carbon material such as acetylene black, Ketjen black, or carbon black.

Examples of the binder may include polytetrafluoroethylene (PTFE), polyvinylidene fluoride (PVDF), a fluororesin copolymer (tetrafluoroethylene-hexafluoropropylene copolymer (FEP)), styrene-butadiene rubber (SBR), acrylic rubber, fluoro-rubber, polyvinyl alcohol (PVA), styrene-maleic acid resin, sodium polyacrylate, and carboxylmethyl cellulose (CMC).

Examples of the solvent may include an organic solvent such as N-methyl-2-pyrrolidone (NMP), and water.

As the negative electrode current collector 170, it is possible to use a conventional current collector, and is possible to use a product obtained by processing a metal such as copper, stainless, titanium, and nickel, specifically foil processed into a sheet, a net, a punched metal or a formed metal, but these are not restrictive.

(Other Configurations)

The positive electrode case 11 and the negative electrode case 16 seal built-in components by using the insulating sealing member 12. The built-in components include the non-aqueous electrolyte 13, the positive electrode 14, the separator 15, the negative electrode 17, the holding member 18, and the like.

The positive electrode mixture layer 141 comes into surface contact with the positive electrode case 11 via the positive electrode current collector 140, to make electrical conduction. The negative electrode mixture layer 171 comes into surface contact with the negative electrode case 16 via the negative electrode current collector 170.

The separator 15 interposed between the positive electrode mixture layer 141 and the negative electrode mixture layer 171 electrically insulates the positive electrode mixture layer 141 and the negative electrode mixture layer 171, and holds the non-aqueous electrolyte 13. As the separator 15, for example, a porous synthetic resin film, especially a porous film of a polyolefin polymer (polyethylene, polypropylene) is used. The separator 15 is molded into a larger size than sizes of the two mixture layers 141, 171 so as to ensure electrical insulation between the two mixture layers 141, 171.

The holding member 18 serves to hold the positive electrode current collector 140, the positive electrode mixture layer 141, the separator 15, the negative electrode mixture layer 171, and the negative electrode current collector 170 at regular positions. The use of an elastic member such as an elastic piece or a spring facilitates holding of those at the regular positions.

The lithium-ion secondary battery 1 of the present embodiment has the coin shape as described above, but the shape is not particularly limited. The lithium-ion secondary battery can be a battery in a variety of shapes such as a cylindrical shape and a prismatic shape, or an irregularly shaped battery sealed in a laminated exterior body.

(Manufacturing Method)

A manufacturing method for the positive electrode material of the present embodiment is not limited so long as the positive electrode material has the above configuration. Examples of the manufacturing method may include a solid-phase synthesis method, a co-precipitation synthesis method, a hydrothermal synthesis method, a polymerized complex synthesis method, a method through ion exchange, a synthesis method by high temperature and high pressure treatment, a sol-gel method, a spray dry method, and a supercritical method. Also, the examples of the manufacturing method may include a method of using these methods solely or in combination.

Examples of Second Embodiment

Hereinafter, examples of the second embodiment will be described more in detail.

As examples for specifically describing the present embodiment, a positive electrode material (positive electrode active material), and a positive electrode and a lithium-ion secondary battery using the positive electrode material were manufactured. In the examples, the lithium-ion secondary battery shown in FIG. 1 was manufactured.

Example 2-1

First, $Na_2NiSnO_4$ as a starting material was manufactured. Specifically, a compound containing one or more elements of Na, Ni, and Sn was weighed and mixed such that these elements were at a predetermined atomic ratio. Then, the compound was sintered (in an atmosphere), to obtain the starting material having an almost single-phase crystal structure.

Subsequently, the obtained $Na_2NiSnO_4$ was heated in a molten salt composed of lithium nitrate and lithium chloride, to carry out ion-exchange treatment.

In the above manner, a positive electrode material ($Li_2NiSnO_4$ powder) of the example 2-1 was manufactured.

Figure 4:
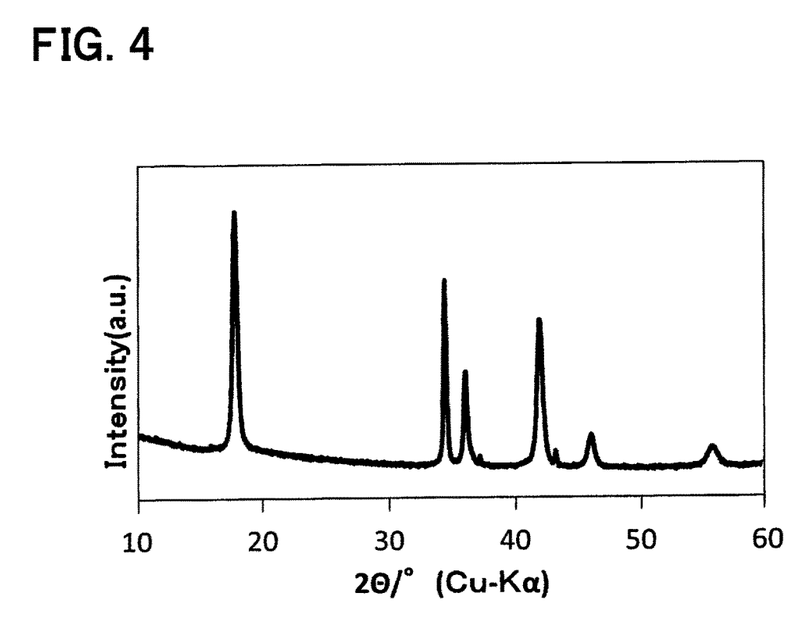
FIG. 4 is a graph showing a measurement result of a powder XRD of a positive electrode material of an example 2-1.

When the manufactured $Li_2NiSnO_4$ powder was observed by powder XRD, diffraction result shown in FIG. 4 was obtained.

According to the result shown in FIG. 4, it was confirmed that the powder was an almost single-phase compound.

Further, when the result was indexed with a space group of R3m, a ratio of a peak intensity ($I_{003}$) of (003) reflection to a peak intensity ($I_{104}$) of (104) reflection, that is, a peak intensity ratio ($I_{003}/I_{104}$) was 1.7.

Example 2-2

Aqueous solutions containing respective metal complexes of Li, Ni, Mn and Ge were prepared. The obtained complex solutions were mixed such that a composition ratio thereof was a composition ratio of a target positive electrode material, namely, an atomic ratio of Li:Ni:Mn:Ge was 2.1:1:0.67:0.33.

The obtained mixed solution was dried in a drying oven to remove an organic component by heating treatment, and was then heated and sintered.

In the above manner, a positive electrode material ($Li_{2.1}NiMn_{0.67}Ge_{0.33}O_4$ powder) of the example 2-2 was manufactured.

When the manufactured $Li_{2.1}NiMn_{0.67}Ge_{0.33}O_4$ powder was observed by powder XRD, it was confirmed that the powder was an almost single-phase compound.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 0.91.

Example 2-3

Similarly to the starting material of the example 2-1, an almost single phase $Na_2NiMn_{0.67}Ge_{0.33}O_4$ was manufactured.

Subsequently, the obtained $Na_2NiMn_{0.67}Ge_{0.33}O_4$ was subjected to the ion-exchange treatment in a similar manner to the case of the example 2-1.

In the above manner, a positive electrode material ($Li_2NiMn_{0.67}Ge_{0.33}O_4$ powder) of the example 2-3 was manufactured.

When the manufactured $Li_2NiMn_{0.67}Ge_{0.33}O_4$ powder was observed by powder XRD, it was confirmed that the powder was an almost single-phase compound.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 1.91.

Example 2-4

In a similar manner to the case of the example 2-2, a positive electrode material ($Li_{2.1}NiMn_{0.67}Sn_{0.33}O_4$ powder) of the example 2-4 was manufactured from aqueous solutions containing respective metal complexes.

When the manufactured $Li_{2.1}NiMn_{0.67}Sn_{0.334}$ powder was observed by powder XRD, it was confirmed that the powder was an almost single-phase compound.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 1.4.

Example 2-5

Similarly to the starting material of the example 2-1, an almost single phase $Na_2NiMn_{0.67}Sn_{0.33}O_4$ was manufactured.

Subsequently, the obtained $Na_2NiMn_{0.67}Sn_{0.33}O_4$ was subjected to the ion-exchange treatment in a similar manner to the case of the example 2-1.

In the above manner, the positive electrode material ($Li_2NiMn_{0.67}Sn_{0.33}O_4$ powder) of the example 2-5 was manufactured.

When the manufactured $Li_2NiMn_{0.67}Sn_{0.33}O_4$ powder was observed by powder XRD, it was confirmed that the powder was an almost single-phase compound.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 1.68.

Example 2-6

In a similar manner to the case of the example 2-2, a positive electrode material ($Li_{2.1}Ni_{0.67}Co_{0.67}Mn_{0.33}Ge_{0.33}O_4$ powder) of the example 2-6 was manufactured from aqueous solutions containing respective metal complexes.

When the manufactured $Li_{2.1}Ni_{0.67}Co_{0.67}Mn_{0.33}Ge_{0.33}O_4$ powder was observed by powder XRD, it was confirmed that the powder was an almost single-phase compound.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 1.35.

Example 2-7

Similarly to the starting material of the example 2-1, an almost single phase $Na_2Ni_{0.67}Co_{0.67}Mn_{0.33}Ge_{0.33}O_4$ was manufactured.

Subsequently, the obtained Na$_2$Ni$_{0.67}$Co$_{0.67}$Mn$_{0.33}$Ge$_{0.33}$O$_4$ was subjected to the ion-exchange treatment in a similar manner to the case of the example 2-1.

In the above manner, a positive electrode material (Li$_2$Ni$_{0.67}$Co$_{0.67}$Mn$_{0.33}$Ge$_{0.33}$O$_4$ powder) of the example 2-7 was manufactured.

When the manufactured Li$_2$Ni$_{0.67}$Co$_{0.67}$Mn$_{0.33}$Ge$_{0.33}$O$_4$ powder was observed by powder XRD, it was confirmed that the powder was an almost single-phase compound.

Further, when the result was indexed with the space group of R3m, a ratio of a peak intensity (I$_{003}$) of (003) reflection to a peak intensity (I$_{104}$) of (104) reflection, that is, the peak intensity ratio (I$_{003}$/I$_{104}$) was 1.55.

Example 2-8

In a similar manner to the case of the example 2-6, a positive electrode material (Li$_{2.1}$Ni$_{0.88}$Co$_{0.22}$Mn$_{0.44}$Ge$_{0.44}$O$_4$ powder) of the example 2-8 was manufactured from aqueous solutions containing respective metal complexes.

When the manufactured Li$_{2.1}$Ni$_{0.88}$Co$_{0.22}$Mn$_{0.44}$Ge$_{0.44}$O$_4$ powder was observed by powder XRD, it was confirmed that the powder was an almost single-phase compound.

Further, when the result was indexed with the space group of R3m, a ratio of a peak intensity (I$_{003}$) of (003) reflection to a peak intensity (I$_{104}$) of (104) reflection, that is, the peak intensity ratio (I$_{003}$/I$_{104}$) was 1.1.

Example 2-9

In a similar manner to the case of the example 2-1 (example 2-7), an almost single phase Na$_2$Ni$_{0.88}$Co$_{0.22}$Mn$_{0.44}$Ge$_{0.44}$O$_4$ was manufactured.

Subsequently, the obtained Na$_2$Ni$_{0.88}$Co$_{0.22}$Mn$_{0.44}$Ge$_{0.44}$O$_4$ was subjected to the ion-exchange treatment in a similar manner to the case of the example 2-1.

In the above manner, a positive electrode material (Li$_2$Ni$_{0.88}$Co$_{0.22}$Mn$_{0.44}$Ge$_{0.44}$O$_4$ powder) of the example 2-9 was manufactured.

When the manufactured Li$_2$Ni$_{0.88}$Co$_{0.22}$Mn$_{0.44}$Ge$_{0.44}$O$_4$ powder was observed by powder XRD, it was confirmed that the powder was an almost single-phase compound.

Further, when the result was indexed with the space group of R3m, a ratio of a peak intensity (I$_{003}$) of (003) reflection to a peak intensity (I$_{104}$) of (104) reflection, that is, the peak intensity ratio (I$_{003}$/I$_{104}$) was 1.34.

Example 2-10

In a similar manner to the case of the example 2-4, a positive electrode material (Li$_{2.1}$NiMn$_{0.33}$Sb$_{0.33}$Al$_{0.33}$O$_4$ powder) of the example 2-10 was manufactured from aqueous solutions containing respective metal complexes.

When the manufactured Li$_{2.1}$NiMn$_{0.33}$Sb$_{0.33}$Al$_{0.33}$O$_4$ powder was observed by powder XRD, it was confirmed that the powder was an almost single-phase compound.

Further, when the result was indexed with the space group of R3m, a ratio of a peak intensity (I$_{003}$) of (003) reflection to a peak intensity (I$_{104}$) of (104) reflection, that is, the peak intensity ratio (I$_{003}$/I$_{104}$) was 1.67.

Example 2-11

In a similar manner to the case of the example 2-1, an almost single phase Na$_2$NiMn$_{0.33}$Sb$_{0.33}$Al$_{0.33}$O$_4$ was manufactured.

Subsequently, the obtained Na$_2$NiMn$_{0.33}$Sb$_{0.33}$Al$_{0.33}$O$_4$ was subjected to the ion-exchange treatment in a similar manner to the case of the example 2-1.

In the above manner, a positive electrode material (Li$_2$NiMn$_{0.33}$Sb$_{0.33}$Al$_{0.33}$O$_4$ powder) of the example 2-11 was manufactured.

When the manufactured Li$_2$NiMn$_{0.33}$Sb$_{0.33}$Al$_{0.33}$O$_4$ powder was observed by powder XRD, it was confirmed that the powder was an almost single-phase compound.

Further, when the result was indexed with the space group of R3m, a ratio of a peak intensity (I$_{003}$) of (003) reflection to a peak intensity (I$_{104}$) of (104) reflection, that is, the peak intensity ratio (I$_{003}$/I$_{104}$) was 1.71.

Example 2-12

In a similar manner to the case of the example 2-2, a positive electrode material (Li$_2$NiMn$_{0.33}$Ge$_{0.67}$O$_4$ powder) of the example 2-12 was manufactured from an aqueous solution containing respective metal complexes.

When the manufactured Li$_2$NiMn$_{0.33}$Ge$_{0.67}$O$_4$ powder was observed by powder XRD, it was confirmed that the powder was an almost single-phase compound.

Further, when the result was indexed with the space group of R3m, a ratio of a peak intensity (I$_{003}$) of (003) reflection to a peak intensity (I$_{104}$) of (104) reflection, that is, the peak intensity ratio (I$_{003}$/I$_{104}$) was 1.54.

Example 2-13

In a similar manner to the case of the example 2-1, an almost single phase Na$_2$N Mn$_{0.33}$Ge$_{0.67}$O$_4$ was manufactured.

Subsequently, the obtained Na$_2$NiMn$_{0.33}$Ge$_{0.67}$O$_4$ was subjected to the ion-exchange treatment in a similar manner to the case of the example 2-1.

In the above manner, a positive electrode material (Li$_2$NiMn$_{0.33}$Ge$_{0.67}$O$_4$ powder) of the example 2-13 was manufactured.

When the manufactured Li$_2$NiMn$_{0.33}$Ge$_{0.67}$O$_4$ powder was observed by powder XRD, it was confirmed that the powder was an almost single-phase compound.

Further, when the result was indexed with the space group of R3m, a ratio of a peak intensity (I$_{003}$) of (003) reflection to a peak intensity (I$_{104}$) of (104) reflection, that is, the peak intensity ratio (I$_{003}$/I$_{104}$) was 1.55.

Example 2-14

In a similar manner to the case of the example 2-4, a positive electrode material (Li$_{2.1}$NiMn$_{0.5}$Sn$_{0.5}$O$_4$ powder) of the example 2-14 was manufactured from aqueous solutions containing respective metal complexes.

When the manufactured Li$_{2.1}$NiMn$_{0.5}$Sn$_{0.5}$O$_4$ powder was observed by powder XRD, it was confirmed that the powder was an almost single-phase compound.

Further, when the result was indexed with the space group of R3m, a ratio of a peak intensity (I$_{003}$) of (003) reflection to a peak intensity (I$_{104}$) of (104) reflection, that is, the peak intensity ratio (I$_{003}$/I$_{104}$) was 1.36.

Example 2-15

In a similar manner to the case of the example 2-1, an almost single phase Na$_2$NiMn$_{0.5}$Sn$_{0.5}$O$_4$ was manufactured.

Subsequently, the obtained $Na_2NiMn_{0.5}Sn_{0.5}O$ was subjected to the ion-exchange treatment in a similar manner to the case of the example 2-1.

In the above manner, a positive electrode material ($Li_2NiMn_{0.5}Sn_{0.5}O_4$ powder) of the example 2-15 was manufactured.

When the manufactured $Li_2NiMn_{0.5}Sn_{0.5}O_4$ powder was observed by powder XRD, it was confirmed that the powder was an almost single-phase compound.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 1.72.

Example 2-16

In a similar manner to the case of the example 2-2, a positive electrode material ($Li_{2.1}Ni_{0.77}Mn_{0.66}Ge_{0.33}O_{3.76}$ powder) of the example 2-16 was manufactured from aqueous solutions containing respective metal complexes.

When the manufactured $Li_{2.1}Ni_{0.77}Mn_{0.66}Ge_{0.33}O_{3.76}$ powder was observed by powder XRD, it was confirmed that the powder was an almost single-phase compound.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 1.32.

Example 2-17

In a similar manner to the case of the example 2-1, an almost single phase $Na_2Ni_{0.77}Mn_{0.66}Ge_{0.33}O_{3.76}$ was manufactured.

Subsequently, the obtained $Na_2Ni_{0.77}Mn_{0.66}Ge_{0.33}O_{3.76}$ was subjected to the ion-exchange treatment in a similar manner to the case of the example 2-1.

In the above manner, a positive electrode material ($Li_2Ni_{0.77}Mn_{0.66}Ge_{0.33}O_{3.76}$ powder) of the example 2-17 was manufactured.

When the manufactured $Li_2Ni_{0.77}Mn_{0.66}Ge_{0.33}O_{3.76}$ powder was observed by powder XRD, it was confirmed that the powder was an almost single-phase compound.

Further, when the result was indexed with the space group of R3m, a ratio of a peak intensity ($I_{0003}$) of (003) reflection to a peak intensity ($I_{104}$) of (104) reflection, that is, the peak intensity ratio ($I_{003}/I_{104}$) was 1.32.

Example 2-18

A positive electrode material of the example 2-18 is $Li_2NiGeO_4$ powder. This composition was confirmed by an ICP analysis.

When $Li_2NiGeO_4$ powder as the positive electrode material of the present example was observed by powder XRD, it was confirmed that the powder was an almost single-phase compound and has a layered rock-salt crystal structure.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 1.01.

Example 2-19

A positive electrode material of the example 2-19 is $Li_2Ni_{0.67}Ge_{0.67}Al_{0.67}O_4$ powder. This composition was confirmed by an ICP analysis.

When the $Li_2Ni_{0.67}Ge_{0.67}Al_{0.67}O_4$ powder of the positive electrode material of the example 2-19 was observed by powder XRD, it was confirmed that the powder was an almost single-phase compound and has a layered rock-salt crystal structure.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 1.78.

Comparative Example 2-1

In a similar manner to the case of the example 2-2, a positive electrode material ($Li_{2.1}NiTiO_4$ powder) of a comparative example 2-1 was manufactured from aqueous solutions containing respective metal complexes.

When the manufactured $Li_{2.1}NiTiO_4$ powder was observed by powder XRD, it was confirmed that the powder was an almost single-phase compound.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 0.

Comparative Example 2-2

In a similar manner to the case of the comparative example 2-1, a positive electrode material ($Li_{2.1}NiMn_{0.33}Ti_{0.67}O_4$ powder) of a comparative example 2-2 was manufactured from aqueous solutions containing respective metal complexes.

When the manufactured $Li_{2.1}NiMn_{0.33}Ti_{0.67}O_4$ powder was observed by powder XRD, it was confirmed that the powder was an almost single-phase compound.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 1.18.

Comparative Example 2-3

In a similar manner to the case of the comparative example 2-1, a positive electrode material ($Li_{1.05}NiO_2$ powder) of a comparative example 2-3 was manufactured from aqueous solutions containing respective metal complexes.

When the manufactured $Li_{1.05}NiO_2$ powder was observed by powder XRD, it was confirmed that the powder was an almost single-phase compound.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 1.35.

Comparative Example 2-4

In a similar manner to the case of the comparative example 2-1, a positive electrode material ($Li_{1.05}CoO_2$ powder) of a comparative example 2-4 was manufactured from aqueous solutions containing respective metal complexes.

When the manufactured $Li_{1.05}CoO_2$ powder was observed by powder XRD, it was confirmed that the powder was an almost single-phase compound.

Further, when the result was indexed with the space group of R3m, a ratio of a peak intensity ($I_{003}$) of (003) reflection to a peak intensity ($I_{104}$) of (104) reflection, that is, the peak intensity ratio ($I_{003}/I_{104}$) was 1.5.

<Evaluation>

As evaluation of the positive electrode material of each example above, a lithium-ion secondary battery was assembled, charge/discharge characteristics were measured. Further, after measurement of the charge/discharge characteristics, the coin type battery was disassembled and the positive electrode was taken out, to evaluate the safety.

CC charge with 4.5 V cut off, and the discharge was performed by CC discharge with 2.6 V cut off.

Figure 5:
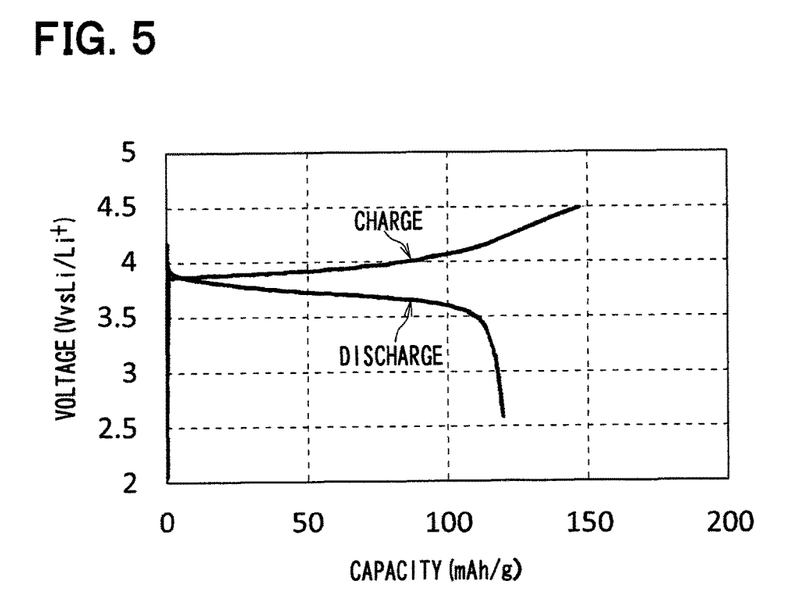
FIG. 5 is a graph showing charge and discharge characteristics of the example 2-1.

Table 2 shows measurement results of a charging capacity and a discharging capacity of the lithium-ion secondary batteries of the examples (Examples 2-1 to 2-19, Comparative Examples 2-1 to 2-4). FIG. 5 shows a charge/discharge characteristic of the lithium ion secondary battery of the example 2-1.

TABLE 2

|  | Positive electrode material | | Battery evaluation | | |
|---|---|---|---|---|---|
|  | Chemical formula | Peak intensity ratio ($I_{003}/I_{104}$) | Charging capacity (mAh/g) | Discharging capacity (mAh/g) | Safety test (wt %) |
| Example 2-1 | $Li_2NiSnO_4$ | 1.7 | 140 | 120 | 0.47 |
| Example 2-2 | $Li_{2.1}NiMn_{0.67}Ge_{0.33}O_4$ | 0.91 | 170 | 155 | 0.49 |
| Example 2-3 | $Li_2NiMn_{0.67}Ge_{0.33}O_4$ | 1.91 | 188 | 172 | 0.48 |
| Example 2-4 | $Li_{2.1}NiMn_{0.67}Sn_{0.33}O_4$ | 1.4 | 152 | 140 | 0.62 |
| Example 2-5 | $Li_2NiMn_{0.67}Sn_{0.33}O_4$ | 1.68 | 157 | 146 | 0.59 |
| Example 2-6 | $Li_{2.1}Ni_{0.67}Co_{0.67}Mn_{0.33}Ge_{0.33}O_4$ | 1.35 | 180 | 161 | 0.71 |
| Example 2-7 | $Li_2Ni_{0.67}Co_{0.67}Mn_{0.33}Ge_{0.33}O_4$ | 1.55 | 178 | 166 | 0.77 |
| Example 2-8 | $Li_{2.1}Ni_{0.88}Co_{0.22}Mn_{0.44}Ge_{0.44}O_4$ | 1.1 | 164 | 147 | 0.65 |
| Example 2-9 | $Li_2Ni_{0.88}Co_{0.22}Mn_{0.44}Ge_{0.44}O_4$ | 1.34 | 164 | 150 | 0.64 |
| Example 2-10 | $Li_{2.1}NiMn_{0.33}Sb_{0.33}Al_{0.33}O_4$ | 1.67 | 139 | 118 | 0.36 |
| Example 2-11 | $Li_2NiMn_{0.33}Sb_{0.33}Al_{0.33}O_4$ | 1.71 | 146 | 121 | 0.38 |
| Example 2-12 | $Li_2NiMn_{0.33}Ge_{0.67}O_4$ | 1.54 | 150 | 130 | 0.37 |
| Example 2-13 | $Li_2NliMn_{0.33}Ge_{0.67}O_4$ | 1.55 | 155 | 138 | 0.42 |
| Example 2-14 | $Li_2NiMn_{0.5}Sn_{0.5}O_4$ | 1.36 | 141 | 113 | 0.46 |
| Example 2-15 | $Li_2NiMn_{0.5}Sn_{0.5}O_4$ | 1.72 | 143 | 122 | 0.41 |
| Example 2-16 | $Li_{2.1}Ni_{0.77}Mn_{0.66}Ge_{0.33}O_{3.76}$ | 1.32 | 162 | 147 | 0.72 |
| Example 2-17 | $Li_2Ni_{0.77}Mn_{0.66}Ge_{0.33}O_{3.76}$ | 1.43 | 169 | 151 | 0.73 |
| Example 2-18 | $Li_2NiGeO_4$ | 0.9 | 152 | 141 | 0.58 |
| Example 2-19 | $Li_2Ni_{0.67}Ge_{0.67}Al_{0.67}O_4$ | 1.78 | 153 | 142 | 0.62 |
| Comparative Example 2-1 | $Li_{2.1}NiTiO_4$ | 0 | 38 | 31 | 0.61 |
| Comparative Example 2-2 | $Li_{2.1}NiMn_{0.33}Ti_{0.67}O_4$ | 0.18 | 62 | 48 | 0.79 |
| Comparative Example 2-3 | $Li_{1.05}NiO_2$ | 1.35 | 172 | 155 | 6.99 |
| Comparative Example 2-4 | $Li_{1.05}CoO_2$ | 1.5 | 141 | 130 | 5.38 |

(Lithium-Ion Secondary Battery)

Using the positive electrode active material of each example above, a test cell (2032 coin type half cell) made of the lithium-ion secondary battery was assembled, to perform evaluation.

(Coin Type Half Cell)

A test cell (coin type half cell) has a similar configuration to that of the coin type lithium-ion secondary battery 1, the configuration of which was shown in FIG. 1.

As the positive electrode, there was used a positive electrode with the positive electrode mixture layer 141 formed by applying a positive electrode mixture, obtained by mixing 91 parts by mass of the positive electrode active material (positive electrode active material of each example), 2 parts by mass of acetylene black, and 7 parts by mass of PVDF, to the positive electrode current collector 140 made of aluminum foil.

As the negative electrode (counter electrode), metallic lithium was used. This corresponds to the negative electrode mixture layer 171 in FIG. 1.

The non-aqueous electrolyte 13 was prepared by dissolving $LiPF_6$ into a mixed solvent of 30 vol % of ethylene carbonate (EC) and 70 vol % of diethyl carbonate (DEC) such that 1 mol/l of $LiPF_6$ was contained.

After being assembled, the test cell was subjected to activation treatment by 1/3 C×2 cycles of charge/discharge.

In the above manner, the test cell (half cell) of each example was manufactured.

<Charge/Discharge Characteristics>

The lithium-ion secondary battery was charged and discharged at the rate of 1/50 C. The charge was performed by As shown in Table 2, the secondary batteries of the examples 2-1 to 2-19 have the excellent charging capacity and the discharging capacity compared to those of the comparative examples 2-1 and 2-2.

Further, as shown in FIG. 5, it was confirmed that the secondary battery of the example 2-1 have favorable charge/discharge characteristics.

<Safety Test>

The lithium-ion secondary battery was charged by CC charge at the rate of 1/50 C up to 4.8 V.

After the charge, the battery was disassembled and the positive electrode was taken out.

The positive electrode taken-out was washed with DMC, and then heated in a helium atmosphere from a room temperature to 1000 degrees Celsius (° C.) with a programming rate of 20° C./min. The amount of oxygen generated from the positive electrode at that time was measured by TPD-MS measurement.

Table 2 also shows measurement results of the amount of oxygen generated.

As shown in Table 2, it is found that the amount of oxygen generated in each of the examples 2-1 to 2-19 is low as compared with that of the comparative examples 2-3 and 2-4, and thus is excellent in safety.

According to the above experiments, the secondary battery of each of the examples has excellent battery characteristics and excellent safety.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A positive electrode material comprising $Li_2Ni_\alpha M^1_\beta M^2_\gamma Mn_\eta O_{4-\epsilon}$ that has a layered structure including a Li layer and a Ni layer, and has a Ni—O bond length being shorter than that calculated from Shannon's ionic radii, wherein:

$\alpha$ satisfies a relation of $0.50 < \alpha \leq 1.33$;
$\beta$ satisfies a relation of $0 \leq \beta < 0.67$;
$\gamma$ satisfies a relation of $0.33 \leq \gamma \leq 1.1$;
$\eta$ satisfies a relation of $0 \leq \eta \leq 1.00$;
$\epsilon$ satisfies a relation of $0 \leq \epsilon \leq 1.00$;
$M^1$ represents at least one selected from Co and Ga; and
$M^2$ represents at least one selected from Ge, Sn and Sb.

2. The positive electrode material according to claim 1, wherein in a radius distribution function obtained by subjecting a result of an X-ray absorption measurement of K-edge of Ni to a Fourier transformation in a range of $3 < k \leq 12$ corresponding to an extended X-ray absorption fine structure region, a distance from the center of Ni to a peak position corresponding to a nearest position being less than $2.04 \times 10^{-10}$ m.

3. A positive electrode for a non-aqueous electrolyte secondary battery, the positive electrode comprising:
the positive electrode material according to claim 1.

4. A non-aqueous electrolyte secondary battery comprising:
a positive electrode including the positive electrode material according to claim 1.

5. A positive electrode material comprising $Li_2Ni_\alpha M^1_\beta M^2_\gamma Mn_\eta O_{4-\epsilon}$ that has a layered structure including a Li layer and a Ni layer, and indicates a peak intensity ratio ($I_{003}/I_{104}$) of 0.9 or more in a measurement of a powder X-ray diffraction indexed with a space group of R3m, wherein:

$\alpha$ satisfies a relation of $0.50 < \alpha \leq 1.33$;
$\beta$ satisfies a relation of $0 \leq \beta < 0.67$;
$\gamma$ satisfies a relation of $0.33 \leq \gamma \leq 1.1$;
$\eta$ satisfies a relation of $0 \leq \eta \leq 1.00$;
$\epsilon$ satisfies a relation of $0 \leq \epsilon \leq 1.00$;
$M^1$ represents at least one selected from Co and Ga;
$M^2$ represents at least one selected from Ge, Sn and Sb; and
the peak intensity ratio ($I_{003}/I_{104}$) is a ratio of a peak intensity ($I_{003}$) of (003) reflection to a peak intensity ($I_{104}$) of (104) reflection.

6. The positive electrode material according to claim 5, wherein the peak intensity ratio ($I_{003}/I_{104}$) is 1.2 or more.

7. A positive electrode for a non-aqueous electrolyte secondary battery, the positive electrode comprising:
the positive electrode material according to claim 5.

8. A non-aqueous electrolyte secondary battery comprising:
a positive electrode including the positive electrode material according to claim 5.

* * * * *